United States Patent
Lee et al.

(10) Patent No.: US 8,494,926 B2
(45) Date of Patent: Jul. 23, 2013

(54) SYSTEM AND METHOD FOR DISPENSING SAMPLES AND COMPUTER READABLE RECORDING MEDIUM

(75) Inventors: Yi-Shiou Lee, Taipei (TW); Feng-Cheng Lin, Taipei (TW); Chih-Hao Hsu, Taipei (TW)

(73) Assignee: Institute for Information Industry, Taipei (TW)

( * ) Notice: Subject to any disclaimer, the term of this patent is extended or adjusted under 35 U.S.C. 154(b) by 526 days.

(21) Appl. No.: 12/636,777

(22) Filed: Dec. 13, 2009

(65) Prior Publication Data

US 2011/0106639 A1   May 5, 2011

(30) Foreign Application Priority Data

Nov. 2, 2009   (TW) .............................. 98137124 A

(51) Int. Cl.
*G06Q 10/00* (2012.01)
*G06Q 30/00* (2012.01)
*G06Q 20/00* (2012.01)
*G06G 1/12* (2006.01)
*G06F 7/08* (2006.01)

(52) U.S. Cl.
USPC ............. 705/28; 705/14.38; 705/22; 235/381

(58) Field of Classification Search
USPC ........................................... 705/14.38, 22, 28
See application file for complete search history.

(56) References Cited

U.S. PATENT DOCUMENTS

| 2003/0216974 | A1* | 11/2003 | Browne | 705/28 |
| 2004/0260470 | A1* | 12/2004 | Rast | 701/300 |
| 2007/0273504 | A1* | 11/2007 | Tran | 340/539.12 |
| 2010/0138037 | A1* | 6/2010 | Adelberg et al. | 700/241 |
| 2010/0262282 | A1* | 10/2010 | Segal et al. | 700/241 |

FOREIGN PATENT DOCUMENTS

| JP | 2001291150 A | 10/2001 |
| JP | 2003208524 A | 7/2003 |
| JP | 2004326746 A | 11/2004 |
| JP | 2006163486 A | 6/2006 |
| JP | 2008234402 A | 10/2008 |
| JP | 2009069785 A | 4/2009 |
| JP | 2009288900 A | 12/2009 |

\* cited by examiner

*Primary Examiner* — Ig T An
(74) *Attorney, Agent, or Firm* — CKC & Partners Co., Ltd.

(57) ABSTRACT

A method and a system for dispensing samples and a computer readable recording medium are disclosed herein, the system can establish a feedback mechanism and recommend one or more suitable samples for a user on the basis of identification information that is inputted by the user.

14 Claims, 6 Drawing Sheets

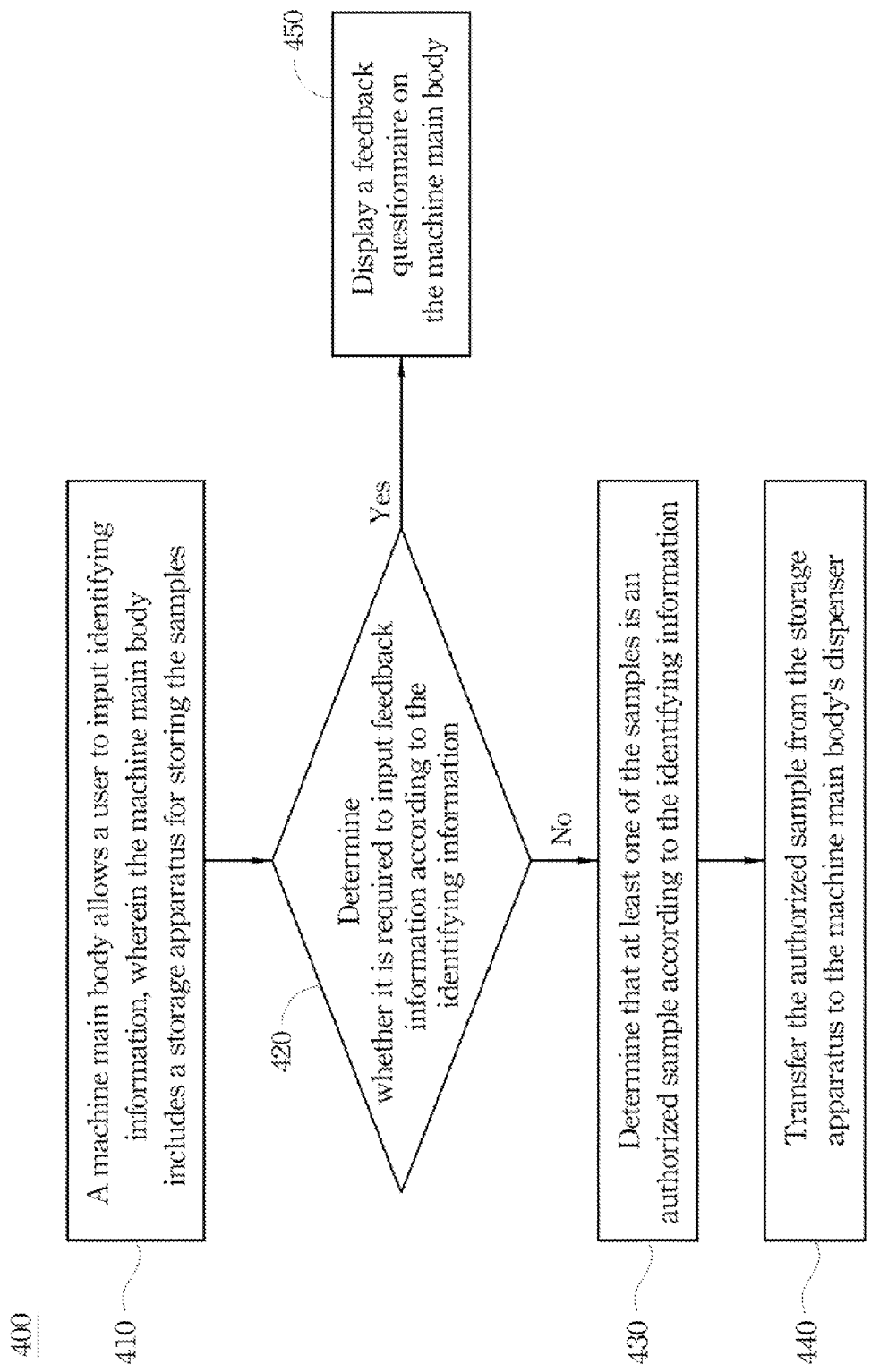

SYSTEM AND METHOD FOR DISPENSING SAMPLES AND COMPUTER READABLE RECORDING MEDIUM

RELATED APPLICATIONS

This application claims priority to Taiwan Application Serial Number 98137124, filed Nov. 2, 2009, which is herein incorporated by reference.

BACKGROUND

1. Technical Field

The present disclosure relates to the automated distribution of samples, and more particularly, systems and methods for dispensing samples.

2. Description of Related Art

A test market, in the field of business and marketing, is a geographic region or demographic group used to gauge the viability of a product or service in the mass market prior to a wide scale roll-out.

The test market ideally aims to duplicate 'everything'—promotion and distribution as well as "product"—on a smaller scale. The technique replicates, typically in one area, what is planned to occur in a national launch; and the results are very carefully monitored, so that they can be extrapolated to projected national results.

Product test marketing is therefore crucial for the producer, the retailer, and the consumer alike, and participation in these offers, when they are legitimate, is beneficial for all parties involved. The producer and retailer win, because they get a great way to popularize their new, existing, and prospective products at a relatively low cost—in today's age of mass production on an immense scale, handing out a few product samples for free is absolutely worth it for most companies.

Nowadays, in relation to dispense samples there are several choices as follows:

1. Some well-known companies may send samples to VIP customers by post; however, there is no feedback mechanism in this manner, the samples cannot be sent to potential customers, and furthermore the user cannot opt the sample that he or she likes.

2. Samples are delivered to customer's home; however, there is no feedback mechanism in this manner, it is difficult to select an area to deliver the samples, and furthermore the user cannot opt the sample that he or she likes.

3. Information of samples for free is inserted in the newspaper or the magazine, so that customers may send letter to the company and therefore the company provides samples for the customers; however, there is no feedback mechanism in this manner, and furthermore the cost is high by post.

4. The retailer, such as a department store, provides samples for free; however, there is no feedback mechanism in this manner, and furthermore the user cannot opt the sample that he or she likes.

5. Samples attached to goods, so that customers may buy the goods and get the sample; however, there is no feedback mechanism in this manner, and furthermore the user cannot opt the sample that he or she likes.

6. The user fills in the blanks of the web page with feedback information, so that the sample is posted to the user and loyalty points are provided for the user; however, the feedback information isn't utilized to improve the effect on distribution of samples, and furthermore the cost is high by post.

Moreover, U.S. Pat. No. 6,021,362 discloses a method for distributing product samples and premiums to consumers, limited to those that qualify by purchase of particular products, or possess such other qualifiers, as predetermined by the manufacturer and/or retailer to be useful in their respective marketing efforts.

A drawback with the keyboard lock disclosed in U.S. Pat. No. 6,021,362 is that there is no feedback mechanism, and furthermore the user cannot opt the sample that he or she likes.

SUMMARY

In view of the above, there is an urgent need in the related field to provide a novel technique capable of dispensing samples. In one or more various aspects, the present disclosure meets this need.

According to one embodiment of the present invention, a system for dispensing samples includes a machine main body, a storage apparatus, a display device, an input device, a controller, a communication device and a processor apparatus. The machine main body has a dispenser. The storage apparatus is configured in the machine main body for storing the samples. The display device is disposed in the machine main body for displaying information. The input device is disposed in the machine main body for allowing a user to input identifying information. The controller is configured in the machine main body for selectively transferring at least one of the samples from the storage apparatus to the dispenser. The communication device is configured in the machine main body. The processor apparatus communicates with the communication device of the machine main body. The processor apparatus includes a feedback module and a recommendation module. The feedback module can determine whether it is required to input feedback information according to the identifying information and turn on the recommendation module when determining it isn't required. The recommendation module can determine that at least one of the samples is an authorized sample according to the identifying information, so that the controller can transfer the authorized sample that is determined by the recommendation module from the storage apparatus to the dispenser.

According to another embodiment of the present invention, a method for dispensing samples includes steps as follows. First, an input device of a machine main body is utilized for allowing a user to input identifying information, wherein the machine main body includes a storage apparatus for storing the samples. Then, whether it is required to input feedback information according to the identifying information is determined. Then, it is determined that at least one of the samples is an authorized sample according to the identifying information when it isn't required to input the feedback information. Then, the authorized sample is transferred from the storage apparatus to a dispenser of the machine main body.

According to yet another embodiment of the present invention, a storage medium to store a plurality of instructions for commanding a machine main body to execute a method for dispensing samples, an input device of the machine main body for allowing a user to input identifying information, the machine main body including a storage apparatus for storing the samples, the method includes steps as follows. First, whether it is required to input feedback information according to the identifying information is determined. Then, it is determined that at least one of the samples is an authorized sample according to the identifying information when it isn't required to input the feedback information. Then, the authorized sample is transferred from the storage apparatus to a dispenser of the machine main body.

The foregoing is a summary and thus contains, by necessity, simplifications, generalizations and omissions of detail;

consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE DRAWINGS

The foregoing summary is illustrative only and is not intended to be in any way limiting. In addition to the illustrative aspects, embodiments, and features described above, further aspects, embodiments, and features will become apparent by reference to the drawings and the following detailed description, of which:

FIG. 6 is a flowchart of a method for dispensing samples according to still yet another embodiment of the present invention.

DETAILED DESCRIPTION

Figure 1:
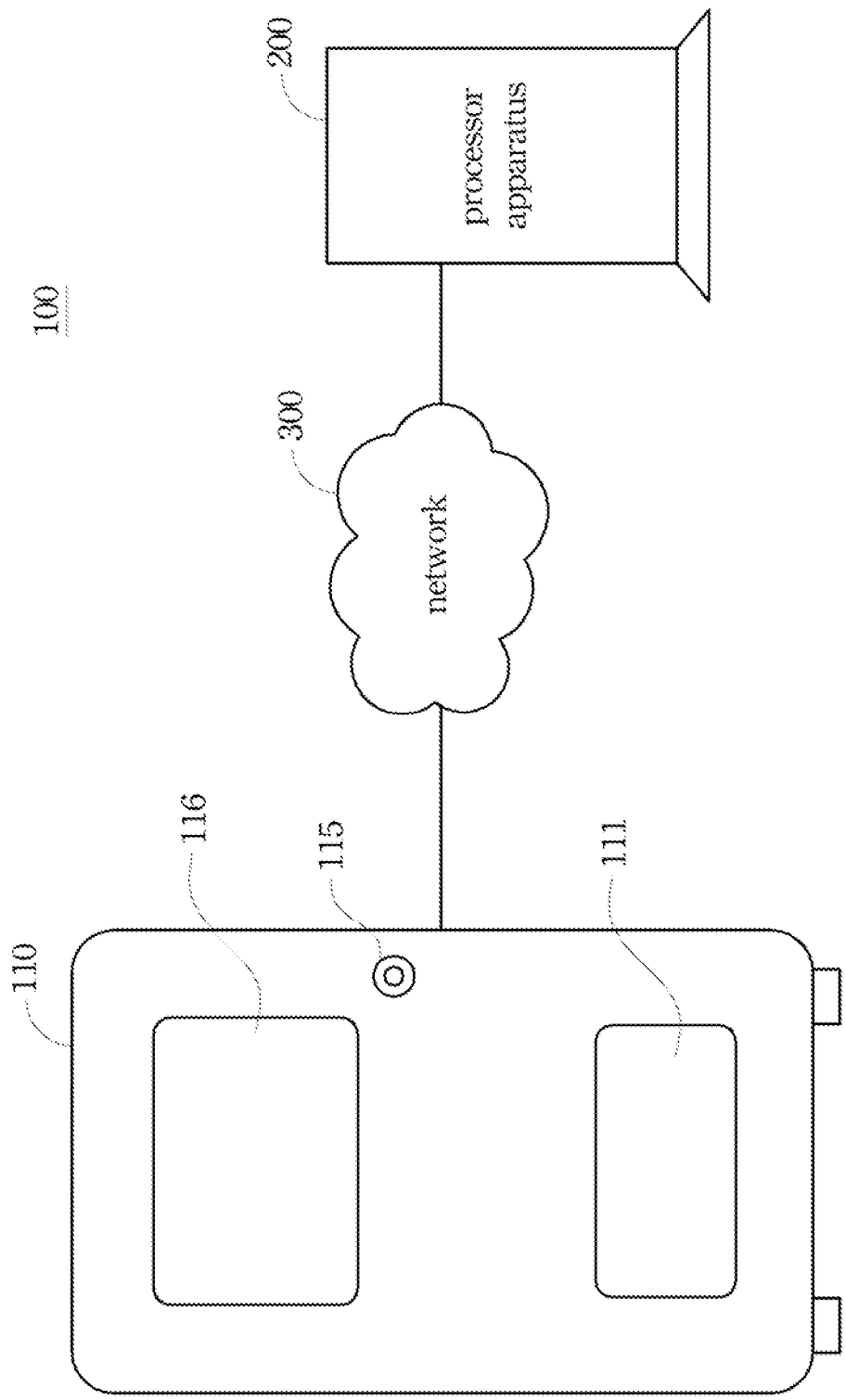
FIG. 1 is a schematic drawing of a system for dispensing samples according to one embodiment of the present invention.
Figure 2:
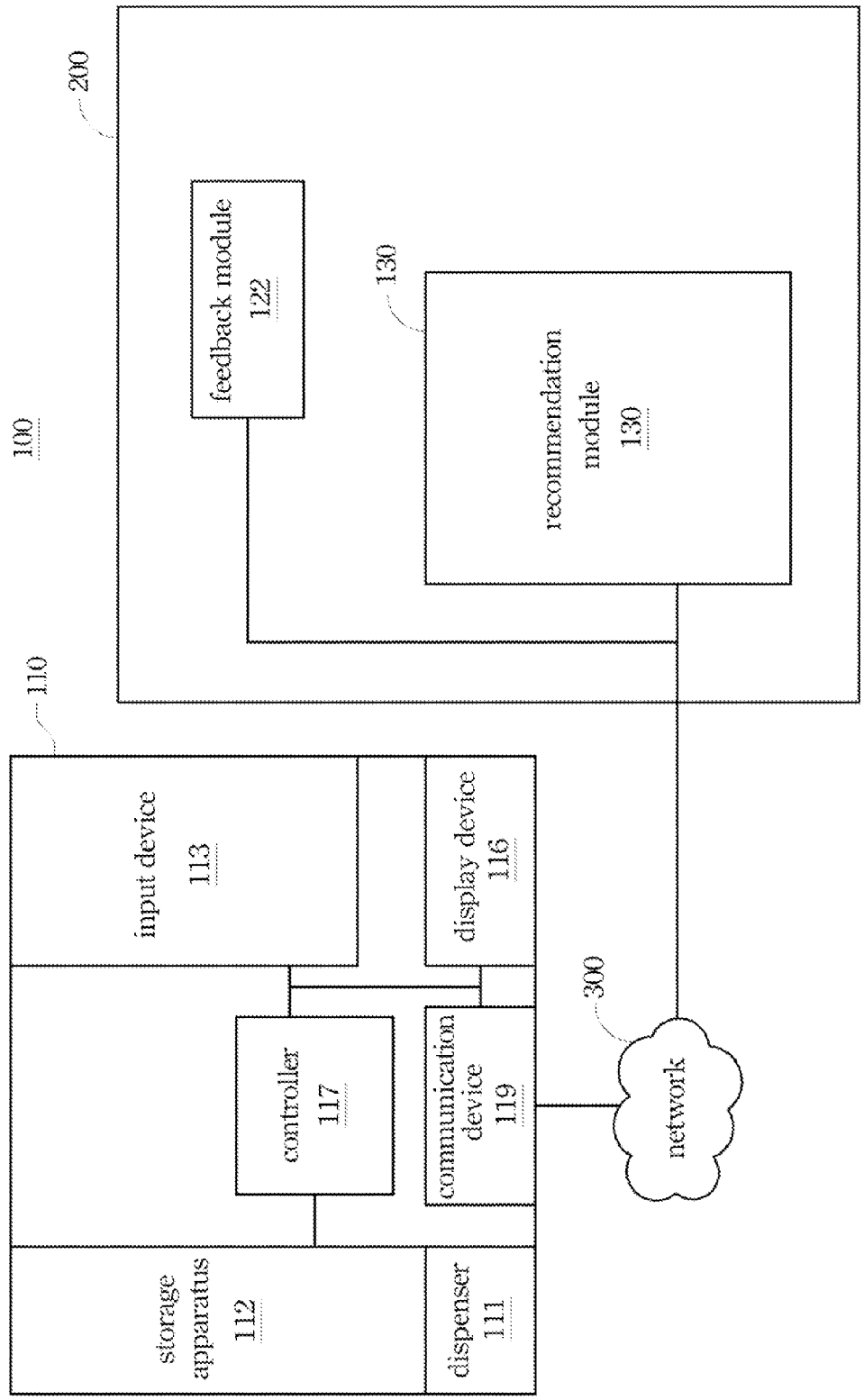
FIG. 2 is a block diagram of the system of FIG. 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.). Further, those skilled in the art will recognize that the mechanical structures disclosed are exemplary structures and many other forms and materials may be employed in constructing such structures.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprise or comprising", "include or including", "have or having", "contain or containing" and the like are to be understood to be open-ended, i.e., to mean including but not limited to. As used herein, the term "and/or" includes any and all combinations of one or more of the associated listed items.

Figure 4:
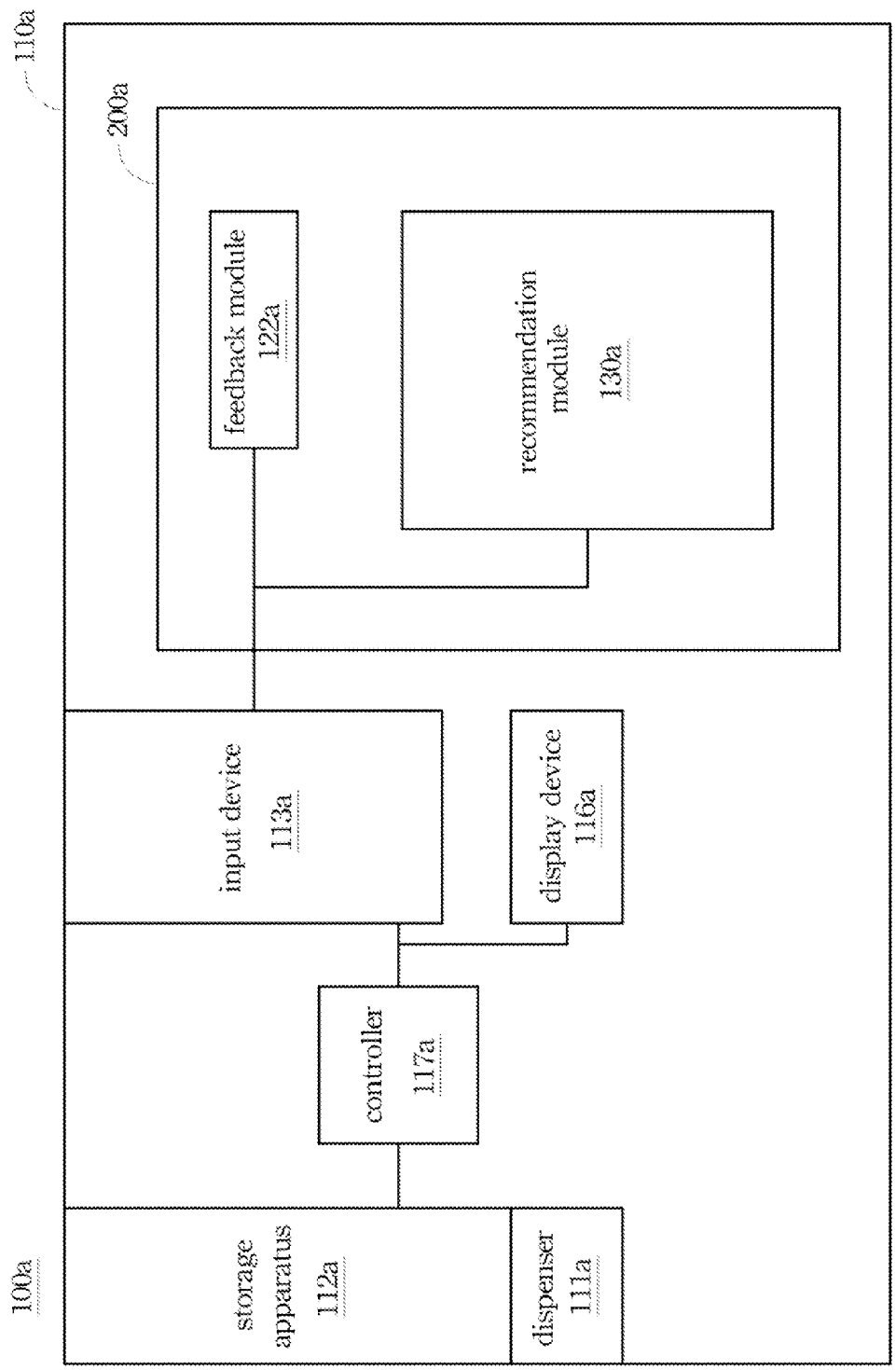
FIG. 4 is a block diagram of a system for dispensing samples according to another embodiment of the present invention.
Figure 5:
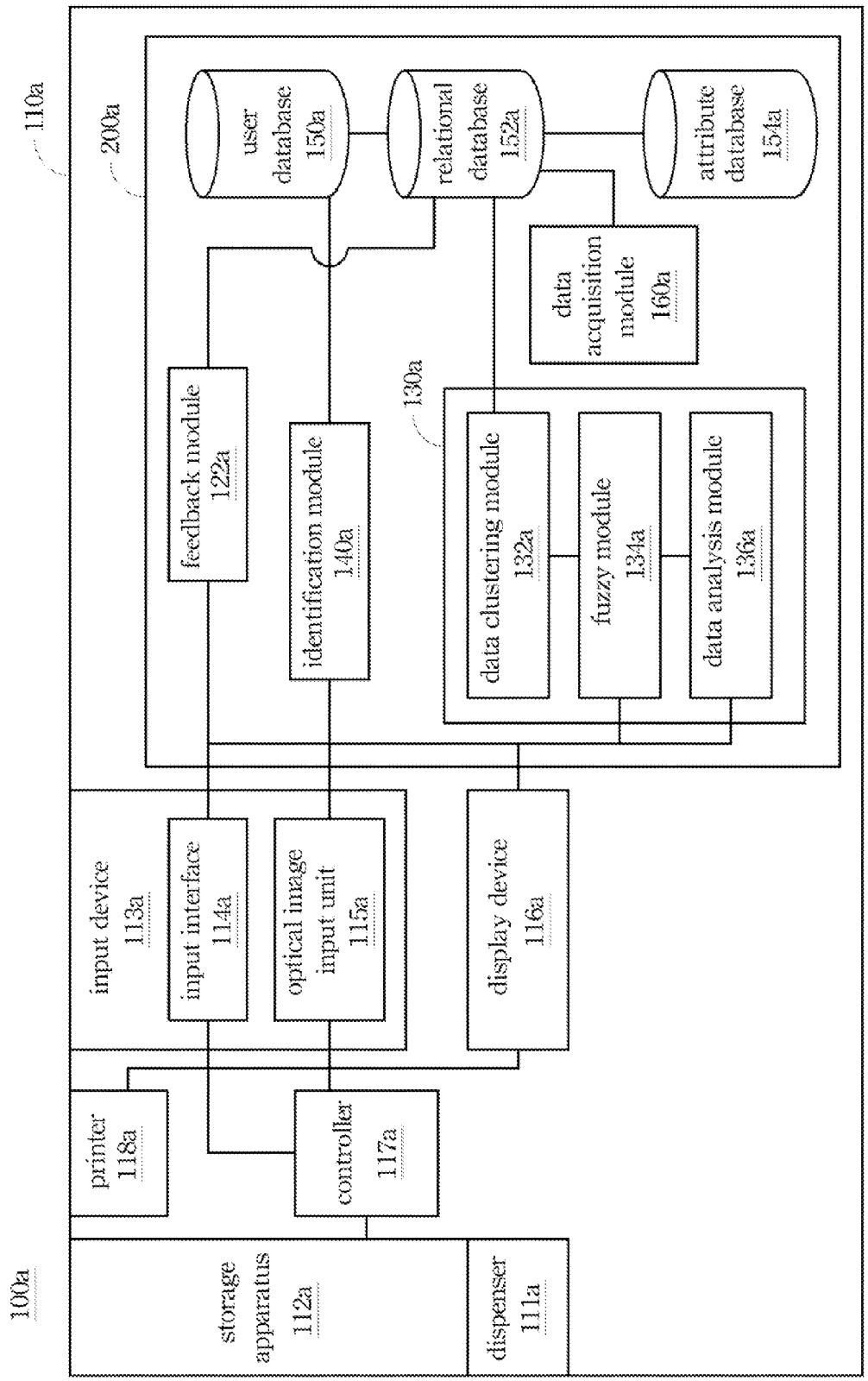
FIG. 5 is a block diagram of a system for dispensing samples according to yet another embodiment of the present invention.

As shown in FIG. 1, the system 100 includes a machine main body 110 and a processor apparatus 200. In one embodiment, the machine main body 110 is connected to the processor apparatus 200 via the network 300; alternatively, the machine main body 110 communicates with the processor apparatus 200 through Recommended Standard 232. In another embodiment, the processor apparatus 200 is integrated into the machine main body 110, as shown in FIG. 4 or FIG. 5.

The system 100 for dispensing samples mainly includes a machine main body 110, a storage apparatus 112, a display device 116, an input device 113, a controller 117, a communication device 119 and a processor apparatus 200. The processor apparatus 200 mainly includes a feedback module 122 and a recommendation module 130.

The machine main body 110 has a dispenser 111. The storage apparatus 112 is configured in the machine main body 110. The input device 113 and the display device 116 are disposed in the machine main body 110. The controller 117 and the communication device 119 are configured in the machine main body 110.

The processor apparatus 200 communicates with the communication device 119 of the machine main body 110. For example, the communication device 119 is a RS-232 interface, a network communication interface, a Universal Serial Bus or the like; the processor apparatus 200 is a processor, a computer, a server or the like.

The storage apparatus 112 can store the samples. The display device 116 can display information. The input device 113 allows a user to input identifying information. The controller 117 can selectively transfer one or more of the samples from the storage apparatus 112 to the dispenser 111. The feedback module 122 can determine whether it is required to input feedback information according to the identifying information and turn on the recommendation module 130 when determining it isn't required to input the feedback information. The recommendation module 130 can determine that at least one of the samples is an authorized sample according to the identifying information, so that the controller 117 can transfer the authorized sample that is determined by the recommendation module 130 from the storage apparatus 112 to the dispenser 111.

Thus, the user can get the sample through the machine main body 110. If it wasn't required to input the feedback information, the user conveniently gets the sample from the dispenser 111 of the machine main body 110.

Figure 3:
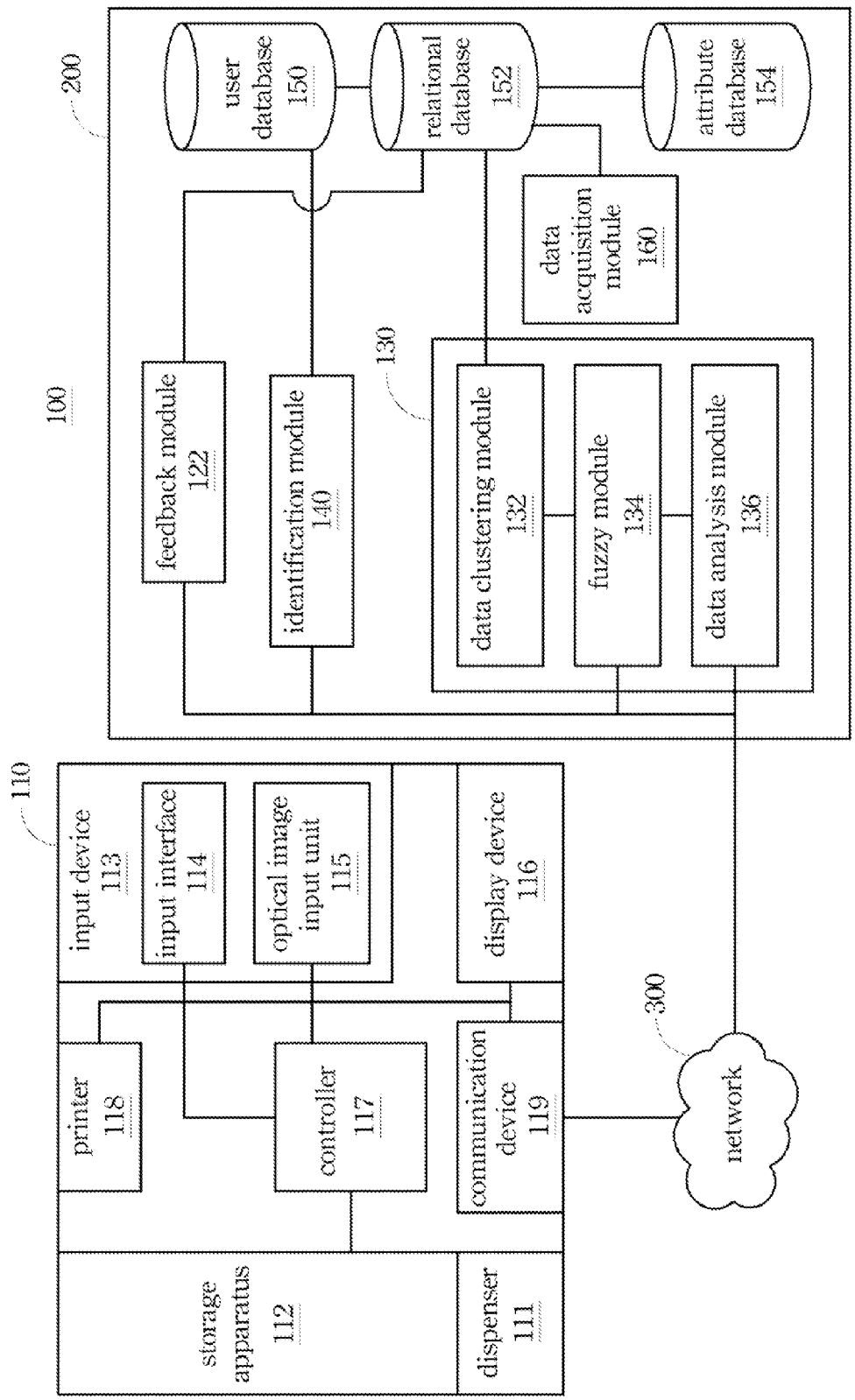
FIG. 3 is another block diagram of the system of FIG. 1.

As shown in FIG. 3, the processor apparatus 200 further includes a user database 150 and an identification module 140.

In use, the user database 150 can record a plurality of user identification data, and the identification module 140 can determine whether the identifying information conforms to one of the user identification data into the user database 150 when the identifying information is acquired by the input device 113 and turn on the feedback module 122 when the identifying information conforms to said one of the user identification data, so that the feedback module 122 can determine whether it is required to input feedback information according to the identifying information and turn on the recommendation module 130 when it isn't required to input the feedback information.

For establishing the feedback mechanism, the user database 150 is capable of recording the information of authorized sample corresponding to the user identification data and feedback data associated with the information of authorized sample. The feedback module 122 determines that it is required to input the feedback information according to the identifying information when the user database records the information of authorized sample but doesn't record the feedback data corresponding to the information of authorized sample; on the contrary, the feedback module 122 determines that it isn't required to input the feedback information according to the identifying information when the user database records the information of authorized sample and the feedback data corresponding to the information of authorized sample.

Thus, the user immediately gets the sample from the dispenser 111 of the machine main body 110 after inputting the feedback information If he or she first got the sample through the machine main body 110.

The feedback module 122 commands the display device 116 to display a feedback questionnaire when determining that it is required to input the feedback information. The input device 113 allows the user to input feedback data responsive to the feedback questionnaire. The feedback module 122 stores the feedback data into the user database 150 after the feedback data are received and further determine that it isn't required to input the feedback information so as to turn on the recommendation module 130.

Thus, the user immediately gets the sample from the dispenser 111 of the machine main body 110 after inputting the feedback information and filling out the feedback questionnaire If it was not his or her first time to get the sample through the machine main body 110. For example, the content of the feedback questionnaire may question about the sample that is got by the user previously or inquire the like.

After the feedback data is received, the feedback module 122 can record premium information for the identifying information into the user database 150. The premium information respects loyalty points, discount or the like.

Thus, the user may be encouraged to fill out the feedback questionnaire for getting remuneration. In this embodiment, the system 100 may include a printer 118. The printer 118 is configured in the machine main body 110. In use, the printer 118 can print a discount coupon according to the premium information, so as to facilitate matters.

When or after the controller 117 transfers the authorized sample from the storage apparatus 112 to the dispenser 111, the recommendation module 130 can record information of authorized sample corresponding to the user identification data and a transferring time at which the authorized sample is transferred from the storage apparatus 112 to the dispenser 111. The identification module 140 can determine whether an interval between the present time and the transferring time is greater than a predetermined period when the identifying information conforms to one of the user identification data. The identification module 140 can further turn on the recommendation module 130 when the interval between the present time and the transferring time is greater than the predetermined period, so as to prevent a speculator repeatedly gets samples from the machine main body 110. In practice, an implementer can determines the time-length of the predetermined period.

For practicing a validation mechanism, the user database 150 can record secret codes corresponding to the user identification data. In use, the input interface 114 of the input device 113 can acquire the identifying information and a cipher; the identification module 140 can determine whether the identifying information conforms to one of the user identification data and whether the cipher conforms to one of the secret codes.

Alternatively or additionally, the user identification data is a face image of the user, and the input device 113 includes an optical image input unit 115. The optical image input unit 115 is embedded in the machine main body 110. In use, the optical image input unit 115 can capture the face image as the identifying information.

In another aspect, the recommendation module 130 can commands the display device to display an intention questionnaire based on the identifying information, the input device 113 allows the user to input intention information responsive to the intention questionnaire, then the recommendation module 130 generates a sample recommendation list based on the intention information with the samples and determines that said at least one of the samples is the authorized sample according to the sample recommendation list.

Thus, the user can input a type of the sample as the intention information, so as to get the sample based on his or her intention.

Alternatively or additionally, the recommendation module 130 can command the display device 116 to display the sample recommendation list comprising a plurality of options corresponding to the samples respectively. The input device allows the user to select at least one of the options of the sample recommendation list. The recommendation module 130 determines the authorized sample corresponding to said at least one of the options in the sample recommendation list.

Thus, the user can input a type of the sample as the intention information, so that the display device 116 displays options corresponding to the samples based on his or her intention. The user may select one option that he or she likes, and therefore the selected sample is transferred to the dispenser 111.

The user database 150 can record user identification data and intention data associated with the user identification data. The identification module 140 can determine whether the identifying information conforms to one of the user identification data of the user database 150 when the identifying information is acquired by the input device 113 and turns on the feedback module 122 when the identifying information conforms to said one of the user identification data. The recommendation module 130 can record the intention data corresponding to the user identification data and the information of authorized sample into the user database 150 when the controller transfers the authorized sample from the storage apparatus 112 to the dispenser 111.

For intelligently recommending samples, the a user database 150 can record user attribute data corresponding to the user identification data, the processor apparatus 200 includes an attribute database 154 and a relational database 152. The attribute database 154 can record a plurality of sample attribute data. The relational database 152 can correlate the sample attribute data with the user identification data and the user attribute data. The recommendation module 130 includes a data-clustering module 132, a fuzzy module 134 and a data analysis module 136. The data-clustering module 132 can group the user identification data into a plurality of groups according to a correlation between the user identification data and the user attribute data. The fuzzy module 134 calculate a membership degree between the identifying information and the groups by utilizing the fuzzy theory, so as to generate weight values corresponding to the groups respectively. The data analysis module 136 can group each of the groups into a plurality of subgroups according to the intention information, then determine that the intention information associated with the identifying information belongs to which one of the subgroups, and acquire one or more of the information of authorized sample corresponding to each of the intention data in said one of the subgroups according to said one of the subgroups and performing statistical analysis accordingly so as to generate a plurality of recommendation values of the samples. The recommendation module 130 generates the sample recommendation list according to the identifying information, the weight values corresponding to each of the groups respectively, and the recommendation values of the samples and then determines the authorized sample according to the sample recommendation list.

Furthermore, the data-clustering module 132 can standardize the user identification data and the user attribute data corresponding to the user identification data and then group the user identification data into the groups according to the correlation between the standardized user identification data and the standardized user attribute data.

For a more understanding of the users' preference, the feedback module 122 can command the display device 116 to display a feedback questionnaire when determining it is required input the feedback information. In use, the input device 113 allows the user to input feedback data responsive to the feedback questionnaire, and the user database 150 records the feedback data, In the processor apparatus 200 a data acquisition module 160 can classify the feedback data and correlate the classified feedback data with the sample attribute data so as to generate key attribute data. Thus, the producers and/or retailers study a market trend based on the key attribute data.

As shown in FIG. 4, the system 100a for dispensing samples mainly includes a machine main body 110a, a storage apparatus 112a, a display device 116a, an input device 113a, a controller 117a, a communication device 119a and a processor apparatus 200a. The processor apparatus 200a mainly includes a feedback module 122a and a recommendation module 130a.

The machine main body 110a has a dispenser 111a. The storage apparatus 112a is configured in the machine main body 110a. The input device 113a and the display device 116a are disposed in the machine main body 110a. The controller 117a and the communication device 119a are configured in the machine main body 110a.

The storage apparatus 112a can store the samples. The display device 116a can display information. The input device 113a allows a user to input identifying information. The controller 117a can selectively transfer one or more of the samples from the storage apparatus 112a to the dispenser 111a. The feedback module 122a can determine whether it is required to input feedback information according to the identifying information and turn on the recommendation module 130a when determining it isn't required to input the feedback information. The recommendation module 130a can determine that at least one of the samples is an authorized sample according to the identifying information, so that the controller 117a can transfer the authorized sample that is determined by the recommendation module 130a from the storage apparatus 112a to the dispenser 111a.

Thus, the user can get the sample through the machine main body 110a. If it wasn't required to input the feedback information, the user conveniently gets the sample from the dispenser 111a of the machine main body 110a.

As shown in FIG. 5, the processor apparatus 200a further includes a user database 150a and an identification module 140a.

In use, the user database 150a can record a plurality of user identification data, and the identification module 140a can determine whether the identifying information conforms to one of the user identification data into the user database 150a when the identifying information is acquired by the input device 113a and turn on the feedback module 122a when the identifying information conforms to said one of the user identification data, so that the feedback module 122a can determine whether it is required to input feedback information according to the identifying information and turn on the recommendation module 130a when it isn't required to input the feedback information.

For establishing the feedback mechanism, the user database 150a is capable of recording information of authorized sample corresponding to the user identification data and feedback data associated with the information of authorized sample. The feedback module 122a determines that it is required to input the feedback information according to the identifying information when the user database records the information of authorized sample but doesn't record the feedback data corresponding to the information of authorized sample; on the contrary, the feedback module 122a determines that it isn't required to input the feedback information according to the identifying information when the user database records the information of authorized sample and the feedback data corresponding to the information of authorized sample.

Thus, the user immediately gets the sample from the dispenser 111a of the machine main body 110a after inputting the feedback information If he or she first got the sample through the machine main body 110a.

The feedback module 122a commands the display device 116a to display a feedback questionnaire when determining that it is required to input the feedback information. The input device 113a allows the user to input feedback data responsive to the feedback questionnaire. The feedback module 122a stores the feedback data into the user database 150a after the feedback data are received and further determine that it isn't required to input the feedback information so as to turn on the recommendation module 130a.

Thus, the user immediately gets the sample from the dispenser 111a of the machine main body 110a after inputting the feedback information and filling out the feedback questionnaire If it was not his or her first time to get the sample through the machine main body 110a. For example, the content of the feedback questionnaire may question about the sample that is got by the user previously or inquire the like.

After the feedback data is received, the feedback module 122a can record premium information for the identifying information into the user database 150a. The premium information respects loyalty points, discount or the like.

Thus, the user may be encouraged to fill out the feedback questionnaire for getting remuneration. In this embodiment, the system 100a may include a printer 118a. The printer 118a is configured in the machine main body 110a. In use, the printer 118a can print a discount coupon according to the premium information, so as to facilitate matters.

When or after the controller 117a transfers the authorized sample from the storage apparatus 112a to the dispenser 111a, the recommendation module 130a can record information of authorized sample corresponding to the user identification data and a transferring time at which the authorized sample is transferred from the storage apparatus 112a to the dispenser 111a. The identification module 140a can determine whether an interval between the present time and the transferring time is greater than a predetermined period when the identifying information conforms to one of the user identification data. The identification module 140a can further turn on the recommendation module 130a when the interval between the present time and the transferring time is greater than the predetermined period, so as to prevent a speculator repeatedly gets samples from the machine main body 110a. In practice, An implementer determines the time-length of the predetermined period.

For practicing a validation mechanism, the user database 150a can record secret codes corresponding to the user identification data. In use, the input interface 114a of the input device 113a can acquire the identifying information and a cipher; the identification module 140a can determine whether the identifying information conforms to one of the user identification data and whether the cipher conforms to one of the secret codes.

Alternatively or additionally, the user identification data is a face image of the user, and the input device 113a includes an optical image input unit 115a. The optical image input unit 115a is embedded in the machine main body 110a. In use, the optical image input unit 115a can capture the face image as the identifying information.

In another aspect, the recommendation module 130a can commands the display device to display an intention questionnaire based on the identifying information, the input device 113a allows the user to input intention information responsive to the intention questionnaire, then the recommendation module 130a generates a sample recommendation list based on the intention information with the samples and determines that said at least one of the samples is the authorized sample according to the sample recommendation list.

Thus, the user can input a type of the sample as the intention information, so as to get the sample based on his or her intention.

Alternatively or additionally, the recommendation module 130a can command the display device 116a to display the sample recommendation list comprising a plurality of options corresponding to the samples respectively. The input device allows the user to select at least one of the options of the sample recommendation list. The recommendation module 130a determines the authorized sample corresponding to said at least one of the options in the sample recommendation list.

Thus, the user can input a type of the sample as the intention information, so that the display device 116a displays options corresponding to the samples based on his or her intention. The user may select one option that he or she likes, and therefore the selected sample is transferred to the dispenser 111a.

The user database 150a can record user identification data and intention data associated with the user identification data. The identification module 140a can determine whether the identifying information conforms to one of the user identification data of the user database 150a when the identifying information is acquired by the input device 113a, and turns on the feedback module 122a when the identifying information conforms to said one of the user identification data. The recommendation module 130a can record the intention data corresponding to the user identification data and the information of authorized sample into the user database 150a when the controller transfers the authorized sample from the storage apparatus 112a to the dispenser 111a.

For intelligently recommending samples, the a user database 150a can record user attribute data corresponding to the user identification data, the processor apparatus 200a includes an attribute database 154a and a relational database 152a. The attribute database 154a can record a plurality of sample attribute data. The relational database 152a can correlate the sample attribute data with the user identification data and the user attribute data. The recommendation module 130a includes a data-clustering module 132a, a fuzzy module 134a and a data analysis module 136a. The data-clustering module 132a can group the user identification data into a plurality of groups according to a correlation between the user identification data and the user attribute data. The fuzzy module 134a calculate a membership degree between the identifying information and the groups by utilizing the fuzzy theory, so as to generate weight values corresponding to the groups respectively. The data analysis module 136a can group each of the groups into a plurality of subgroups according to the intention information, then determine that the intention information associated with the identifying information belongs to which one of the subgroups, and acquire one or more of the information of authorized sample corresponding to each of the intention data in said one of the subgroups according to said one of the subgroups and performing statistical analysis accordingly so as to generate a plurality of recommendation values of the samples. The recommendation module 130a generates the sample recommendation list according to the identifying information, the weight values corresponding to each of the groups respectively, and the recommendation values of the samples and then determines the authorized sample according to the sample recommendation list.

Furthermore, the data-clustering module 132a can standardize the user identification data and the user attribute data corresponding to the user identification data and then group the user identification data into the groups according to the correlation between the standardized user identification data and the standardized user attribute data.

For a more understanding of the users' preference, the feedback module 122a can command the display device 116a to display a feedback questionnaire when determining it is required input the feedback information. In use, the input device 113a allows the user to input feedback data responsive to the feedback questionnaire, and the user database 150a records the feedback data, In the processor apparatus 200a a data acquisition module 160a can classify the feedback data and correlate the classified feedback data with the sample attribute data so as to generate key attribute data. Thus, the producers and/or retailers study a market trend based on the key attribute data.

As shown in FIG. 6, the method 400 for dispensing samples may be implemented in a system, such as foresaid system 100 or 100a. The method 400 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

The method 400 includes steps 410-450 as follows (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

An input device of a machine main body is utilized for allowing a user to input identifying information in step 410, wherein the machine main body includes a storage apparatus for storing the samples. In step 420, whether it is required to input feedback information according to the identifying information is determined. In step 430, it is determined that at least one of the samples is an authorized sample according to the identifying information when it isn't required to input the feedback information. In step 440, the authorized sample is transferred from the storage apparatus to a dispenser of the machine main body.

Thus, the user can get the sample through the machine main body. If it wasn't required to input the feedback information, the user conveniently gets the sample from the dispenser of the machine main body.

In method 400, a plurality of user identification data are record, and whether the identifying information conforms to one of the user identification data is determined when the identifying information is acquired by the input device. Step 420 is performed when the identifying information conforms to said one of the user identification data. Therefore, step 420 is performed to determine whether it is required to input feedback information according to the identifying information. Then, step 430 is performed when it isn't required to input the feedback information.

For establishing the feedback mechanism, in the method 400 the information of authorized sample corresponding to the user identification data and feedback data associated with the information of authorized sample are recorded. Step 420 is to determine that it is required to input the feedback information according to the identifying information when the information of authorized sample are recorded but the feedback data aren't recorded; alternatively, step 420 is to determine that it isn't required to input the feedback information according to the identifying information when the information of authorized sample and the feedback data corresponding to the information of authorized sample are recorded.

In step 420, a display device of the machine main body is commanded to display a feedback questionnaire when it is required to input the feedback information, wherein the input device allows the user to input feedback data responsive to the feedback questionnaire; then, the feedback data are stored after the feedback data are received, and that it isn't required to input the feedback information as determined, so as to perform the step 430. In step 430, it is determined that at least one of the samples is an authorized sample according to the identifying information when it isn't required to input the feedback information. In step 440, the authorized sample is transferred from the storage apparatus to a dispenser of the machine main body.

After the feedback data is received, In step 420, premium information for the identifying information are recorded. The premium information respects loyalty points, discount or the like. In optional a printer of the machine main body is commanded to print a discount coupon according to the premium information in the method 400.

When or after the authorized sample is transferred to the dispenser, the information of authorized sample corresponding to the user identification data and a transferring time at which the authorized sample is transferred to the dispenser are recorded in the method 400. Then, whether an interval between the present time and the transferring time is greater than a predetermined period is determined when the identifying information conforms to one of the user identification data. Then, step 430 is performed when the interval between the present time and the transferring time is greater than the predetermined period, so as to prevent a speculator repeatedly gets samples from the machine main body. In practice, an implementer can determines the time-length of the predetermined period.

For practicing a validation mechanism, secret codes corresponding to the user identification data are recorded in the method 400. In step 410, the identifying information and a cipher are acquired through the input interface of the input device. Then, whether the identifying information conforms to one of the user identification data, and whether the cipher conforms to one of the secret codes is also determined.

Alternatively or additionally, the user identification data is a face image of the user. In step 410, the face image is captured as the identifying information through a optical image input unit of the input device.

In another aspect, the display device is commanded to display an intention questionnaire based on the identifying information in step 430, wherein the input device allows the user to input intention information responsive to the intention questionnaire. Then, a sample recommendation list based on the intention information and the samples is generated, so as to determine that said at least one of the samples is the authorized sample according to the sample recommendation list.

Alternatively or additionally, in step 430 the display device is commanded to display the sample recommendation list comprising a plurality of options corresponding to the samples respectively. The input device allows the user to select at least one of the options of the sample recommendation list, so that step 430 is to determine the authorized sample corresponding to said at least one of the options in the sample recommendation list.

Thus, the user can input a type of the sample as the intention information, so that the display device displays options corresponding to the samples based on his or her intention. The user may select one option that he or she likes, and therefore the selected sample is transferred to the dispenser.

In the method 400, user identification data and intention data associated with the user identification data are recorded, so as to determine whether the identifying information conforms to one of the user identification data when the input device has acquired the identifying information and to perform step 420 when the identifying information conforms to said one of the user identification data. In step 430, the intention data corresponding to the user identification data and the information of authorized sample are recorded when the authorized sample is transferred to the dispenser.

For intelligently recommending samples, user attribute data corresponding to the user identification data are recorded in the method 400, and furthermore sample attribute data are recorded. Then the sample attribute data are correlated with the user identification data and the user attribute data. Step 430 includes sub-steps as follows:

(1) The user identification data are grouped into a plurality of groups according to a correlation between the user identification data and the user attribute data.

(2) A membership degree between the identifying information and the groups by utilizing the fuzzy theory is calculated, so as to generate weight values corresponding to the groups respectively.

(3) Each of the groups are grouped into a plurality of subgroups according to the intention information for determining that the intention information associated with the identifying information belongs to which one of the subgroups, and then one or more of the information of authorized sample corresponding to each of the intention data in said one of the subgroups are acquired according to said one of the subgroups; accordingly statistical analysis is performed so as to generate a plurality of recommendation values of the samples.

Furthermore, in step 430 the sample recommendation list is generated according to the identifying information, the weight values corresponding to each of the groups respectively, and the recommendation values of the samples, and then the authorized sample is determined according to the sample recommendation list.

In foresaid sub-step (1), the user identification data and the user attribute data corresponding to the user identification data are standardized, and then the user identification data are grouped into the groups according to the correlation between the standardized user identification data and the standardized user attribute data.

For a more understanding of the users' preference, the display device is commanded to display a feedback questionnaire in step 450 when it is required input the feedback information. In use, the input device allows the user to input feedback data responsive to the feedback questionnaire. In the method 400, the feedback data are classified, and the classified feedback data are correlated with the sample attribute data so as to generate key attribute data. Thus, the producers and/or retailers study a market trend based on the key attribute data.

The foresaid user database, attribute database and relational database may be stored in different data storage devices or in the same data storage device, such as a computer hard disk, a server, an external hard disk, a keychain drive or another computer-readable storage medium. One of ordinary skill in the art will appreciate that the above denomination is provided for illustrative purposes only to further explain applications of these databases and are not meant to limit the number of databases and data content in any manner. In one or more embodiments, one database may be divided into various databases, or one database may be integrated into another database. Those with ordinary skill in the art may design one or more these databases depending on the desired application.

The reader's attention is directed to all papers and documents which are filed concurrently with his specification and which are open to public inspection with this specification, and the contents of all such papers and documents are incorporated herein by reference.

It will be understood that the above description of embodiments is given by way of example only and that those with ordinary skill in the art may make various modifications. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A system for dispensing samples, the system comprising:
   a machine main body having a dispenser;
   a storage apparatus configured in the machine main body for storing a plurality of samples;
   a display device disposed in the machine main body for displaying information;
   an input device disposed in the machine main body for allowing a user to input identifying information;
   a controller configured in the machine main body for selectively transferring at least one of the samples from the storage apparatus to the dispenser;
   a communication device configured in the machine main body;
   a user database for recording user identification data, intention data associated with the user identification data and user attribute data corresponding to the user identification data; and
   a processor apparatus communicating with the communication device of the machine main body and comprising an attribute database, a relational database, a feedback module and a recommendation module, wherein the attribute database records a plurality of sample attribute data, the relational database correlates the sample attribute data with the user identification data and the user attribute data, the feedback module determines whether it is required to input feedback information according to the identifying information and turning on the recommendation module when it isn't required, and the recommendation module determines that at least one of the samples is an authorized sample according to the identifying information, wherein the recommendation module commands the display device to display an intention questionnaire based on the identifying information, the input device allows the user to input intention information responsive to the intention questionnaire, and then the recommendation module generates a sample recommendation list based on the intention information with the samples and determines at least one of the samples is the authorized sample according to the sample recommendation list, and the controller further for transferring the authorized sample that is determined by the recommendation module from the storage apparatus to the dispenser, wherein the processor apparatus further comprising: an identification module for determining whether the identifying information conforms to one of the user identification data of the user database when the identifying information has acquired by the input device and turning on the feedback module when the identifying information conforms to said one of the user identification data, and wherein the recommendation module comprises: a data-clustering module for grouping the user identification data into a plurality of groups according to a correlation between the user identification data and the user attribute data; a fuzzy module for calculating a membership degree between the identifying information and the groups by utilizing the fuzzy theory, so as to generate weight values corresponding to the groups respectively; a data analysis module for grouping each of the groups into a plurality of subgroups according to the intention information, determining that the intention information associated with the identifying information belongs to which one of the subgroups, acquiring one or more of the information of authorized sample corresponding to each of the intention data in said one of the subgroups according to said one of the subgroups and performing statistical analysis accordingly so as to generate a plurality of recommendation values of the samples, wherein the recommendation module generates the sample recommendation list according to the identifying information, the weight values corresponding to each of the groups respectively, and the recommendation values of the samples, determines the authorized sample according to the sample recommendation list, and records the intention data corresponding to the user identification data and the information of authorized sample into the user database and relational database when the controller transfers the authorized sample from the storage apparatus to the dispenser.

2. The system of claim 1, wherein the user database is capable of recording the information of authorized sample corresponding to the user identification data and feedback data associated with the information of authorized sample, the feedback module determines that it is required to input the feedback information according to the identifying information when the user database records the information of authorized sample but doesn't record the feedback data corresponding to the information of authorized sample, and the feedback module determines that it isn't required to input the feedback information according to the identifying information when the user database records the information of authorized sample and the feedback data corresponding to the information of authorized sample.

3. The system of claim 2, wherein the feedback module commands the display device to display a feedback questionnaire when determining that it is required to input the feedback information; the input device allows the user to input feedback data responsive to the feedback questionnaire; and the feedback module stores the feedback data into the user database after the feedback data are received, and further determine that it isn't required to input the feedback information so as to turn on the recommendation module.

4. The system of claim 1, wherein the user identification data is a face image of the user, and the input device comprises an optical image input unit embedded in the machine main body for capturing the face image as the identifying information.

5. The system of claim 1, wherein the recommendation module commands the display device to display the sample recommendation list comprising a plurality of options corresponding to the samples respectively, the input device allows the user to select at least one of the options of the sample recommendation list, and the recommendation module determines the authorized sample corresponding to said at least one of the options in the sample recommendation list.

6. The system of claim 1, wherein the feedback module commands the display device to display a feedback questionnaire when determining it is required to input the feedback information, the input device allows the user to input feedback data responsive to the feedback questionnaire, and the user database records the feedback data; and wherein the processor apparatus further comprises:
a data acquisition module for classifying the feedback data and correlating the classified feedback data with the sample attribute data so as to generate key attribute data.

7. A method for dispensing samples, the method comprising:
(a) utilizing an input device of a machine main body for allowing a user to input identifying information, wherein the machine main body includes a storage apparatus for storing the samples, user identification data and intention data associated with the user identification data, user attribute data corresponding to the user identification data, a plurality of sample attribute data, the sample attribute data with the user identification data and the user attribute data;
(b) determining whether it is required to input feedback information according to the identifying information;
(c) commanding a display device of the machine main body to display an intention questionnaire based on the identifying information when it isn't required to input the feedback information, wherein the input device allows the user to input intention information responsive to the intention questionnaire; generating a sample recommendation list based on the intention information and the samples; and then determining that at least one of the samples is the authorized sample according to the sample recommendation list; and
(d) transferring the authorized sample from the storage apparatus to a dispenser of the machine main body;
determining whether the identifying information conforms to one of the user identification data when the identifying information is acquired by the input device and performing the step (b) when the identifying information conforms to said one of the user identification data, and wherein the step (c) comprises:
grouping the user identification data into a plurality of groups according to a correlation between the user identification data and the user attribute data;

calculating a membership degree between the identifying information and the groups by utilizing the fuzzy theory, so as to generate weight values corresponding to the groups respectively;

grouping each of the groups into a plurality of subgroups according to the intention information, determining that the intention information associated with the identifying information belongs to which one of the subgroups, acquiring one or more of the information of authorized sample corresponding to each of the intention data in said one of the subgroups according to said one of the subgroups and performing statistical analysis accordingly so as to generate a plurality of recommendation values of the samples;

generating the sample recommendation list according to the identifying information, the weight values corresponding to each of the groups respectively, and the recommendation values of the samples;

determining the authorized sample according to the sample recommendation list; and recording the intention data corresponding to the user identification data and the information of authorized sample when the step (d) is performed.

8. The method of claim 7, further comprising:
(e) recording the information of authorized sample corresponding to the user identification data and feedback data associated with the information of authorized sample, wherein step (b) comprises:
determining that it is required to input the feedback information according to the identifying information when the information of authorized sample are recorded but the feedback data aren't recorded; and
determining that it isn't required to input the feedback information according to the identifying information when the information of authorized sample and the feedback data corresponding to the information of authorized sample are recorded.

9. The method of claim 8, wherein step (b) further comprises:
commanding a display device of the machine main body to display a feedback questionnaire when it is required to input the feedback information, wherein the input device allows the user to input feedback data responsive to the feedback questionnaire; and
storing the feedback data after the feedback data are received, and determining that it isn't required to input the feedback information so as to perform the step (c).

10. The method of claim 9, wherein the user identification data is a face image of the user, and the step (a) comprises:
capturing the face image as the identifying information through an optical image input unit of the input device.

11. The method of claim 7, wherein step (c) further comprises:
commanding the display device to display the sample recommendation list comprising a plurality of options corresponding to the samples respectively, wherein the input device allows the user to select at least one of the options of the sample recommendation list;
determining the authorized sample corresponding to said at least one of the options in the sample recommendation list.

12. The method of claim 7, wherein the step (b) further comprises:
commanding the display device to display a feedback questionnaire when determining it is required to input the feedback information, wherein the input device allows the user to input feedback data responsive to the feedback questionnaire, the method further comprising:
recording the feedback data; and
classifying the feedback data and correlating the classified feedback data with the sample attribute data so as to generate key attribute data.

13. A storage medium to store a plurality of instructions for commanding a machine main body to execute a method for dispensing samples, an input device of the machine main body for allowing a user to input identifying information, the machine main body including a storage apparatus for storing the samples, the method comprising:
(a) recording user identification data, intention data associated with the user identification data and user attribute data corresponding to the user identification data; recording a plurality of sample attribute data; and correlating the sample attribute data with the user identification data and the user attribute data; and determining whether it is required to input feedback information according to the identifying information;
(b) commanding a display device of the machine main body to display an intention questionnaire based on the identifying information when it isn't required to input the feedback information, wherein the input device allows the user to input intention information responsive to the intention questionnaire; generating a sample recommendation list based on the intention information and the samples; and then determining that at least one of the samples is the authorized sample according to the sample recommendation list; and
(c) transferring the authorized sample from the storage apparatus to a dispenser of the machine main body;
determining whether the identifying information conforms to one of the user identification data when the input device has acquired the identifying information and performing the step (a) when the identifying information conforms to said one of the user identification data, and wherein the step (b) comprises;
commanding the display device to display the sample recommendation list comprising a plurality of options corresponding to the samples respectively, wherein the input device allows the user to select at least one of the options of the sample recommendation list;
determining the authorized sample corresponding to said at least one of the options in the sample recommendation list;
grouping the user identification data into a plurality of groups according to a correlation between the user identification data and the user attribute data;
calculating a membership degree between the identifying information and the groups by utilizing the fuzzy theory, so as to generate weight values corresponding to the groups respectively;
grouping each of the groups into a plurality of subgroups according to the intention information, determining that the intention information associated with the identifying information belongs to which one of the subgroups, acquiring one or more of the information of authorized sample corresponding to each of the intention data in said one of the subgroups according to said one of the subgroups and performing statistical analysis accordingly so as to generate a plurality of recommendation values of the samples;
generating the sample recommendation list according to the identifying information, the weight values corresponding to each of the groups respectively, and the recommendation values of the samples;

determining the authorized sample according to the sample recommendation list; and recording the intention data corresponding to the user identification data and the information of authorized sample when the step (c) is performed.

14. The storage medium of claim 13, wherein the method further comprises:
(d) recording information of authorized sample corresponding to the user identification data and feedback data associated with the information of authorized sample, wherein step (a) comprises:

determining that it is required to input the feedback information according to the identifying information when the information of authorized sample are recorded but the feedback data aren't record; and determining that it isn't required to input the feedback information according to the identifying information when the information of authorized sample and the feedback data corresponding to the information of authorized sample are recorded;

commanding a display device of the machine main body to display a feedback questionnaire when determining that it is required to input the feedback information, wherein the input device allows the user to input feedback data responsive to the feedback questionnaire; and storing the feedback data after the feedback data are received, and determining that it isn't required to input the feedback information so as to perform the step (c).

* * * * *